US011892139B2

(12) United States Patent
Jung et al.

(10) Patent No.: US 11,892,139 B2
(45) Date of Patent: Feb. 6, 2024

(54) VEHICLE LAMP

(71) Applicant: SL Corporation, Daegu (KR)

(72) Inventors: Se Hyun Jung, Gyeongsan-si (KR); Byung Dong Choi, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 18/087,142

(22) Filed: Dec. 22, 2022

(65) Prior Publication Data

US 2023/0204177 A1 Jun. 29, 2023

(30) Foreign Application Priority Data

Dec. 28, 2021 (KR) ........................ 10-2021-0189151

(51) Int. Cl.

| | |
|---|---|
| ***F21S 41/692*** | (2018.01) |
| ***F21S 41/32*** | (2018.01) |
| ***F21S 41/151*** | (2018.01) |
| ***F21S 45/47*** | (2018.01) |
| ***F21S 41/148*** | (2018.01) |
| ***F21S 41/25*** | (2018.01) |
| *F21W 102/135* | (2018.01) |

(52) U.S. Cl.
CPC ........... *F21S 41/321* (2018.01); *F21S 41/148* (2018.01); *F21S 41/151* (2018.01); *F21S 41/25* (2018.01); *F21S 45/47* (2018.01); *F21W 2102/135* (2018.01)

(58) Field of Classification Search
CPC ...... F21S 41/255; F21S 41/148; F21S 41/265; F21S 41/365; F21S 41/321; F21S 41/36; F21S 41/43; F21W 2102/13; F21W 2102/155; F21Y 2115/10
See application file for complete search history.

(56) References Cited

U.S. PATENT DOCUMENTS

2013/0051056 A1* 2/2013 Okubo .................... F21S 41/29
362/520
2019/0234580 A1* 8/2019 Wang .................... F21S 41/285

* cited by examiner

*Primary Examiner* — Elmito Breval
(74) *Attorney, Agent, or Firm* — United One Law Group LLC; Kongsik Kim; Jhongwoo Peck

(57) ABSTRACT

A lamp for a vehicle includes a first light source unit including a plurality of first light sources and for irradiating a first light that forms a first beam pattern, a second light source unit including a plurality of second light sources and for irradiating a second light that forms a second beam pattern, a first reflector including a plurality of first reflection units corresponding to the plurality of first light sources and for reflecting the first light, and a second reflector including a plurality of second reflection units corresponding to the plurality of second light sources and for reflecting the second light. In particular, the plurality of first light sources are disposed along an arc having a first curvature, and the plurality of second light sources are disposed along an arc having a second curvature, the second curvature is greater than the first curvature.

18 Claims, 17 Drawing Sheets

VEHICLE LAMP

CROSS REFERENCE TO RELATED APPLICATION

This application claims priority from Korean Patent Application No. 10-2021-0189151, filed on Dec. 28, 2021, which is incorporated herein by reference in its entirety.

BACKGROUND

1. Technical Field

The present disclosure relates to a vehicle lamp, and more particularly, to a vehicle lamp that forms a high beam pattern and a low beam pattern in a single module.

2. Description of the Related Art

In general, a vehicle is provided with various types of lamps having an illumination function for easily identifying an object located around the vehicle during low light conditions (e.g., night-time driving) and a signaling function for notifying other vehicles or road users of the driving state of the vehicle.

For example, a head lamp and a fog lamp are primarily for the purpose of the illumination function, and a turn signal lamp, a tail lamp, a brake lamp, and a side marker are primarily for the purpose of the signaling function. The installation standards and specifications for these lamps are stipulated by laws and regulations to ensure that all functions are fully performed.

The head lamp forms a low-beam pattern and/or a high-beam pattern so that the driver's forward view can be secured when the vehicle is operated in low light environment such as at night, and plays an important role in safe driving.

On the other hand, when a low beam module forming a low beam pattern and a high beam module forming a high beam pattern are separately provided and disposed in a vehicle, a space for the low beam module and the high beam module should be separately provided, so there can be inefficiency in space utilization. In addition, since parts for each module should be separately provided, the manufacturing cost increases.

Accordingly, a vehicle lamp, in which modules forming a low beam pattern and a high beam pattern are integrally implemented, is required.

SUMMARY

The problem to be solved by the present disclosure relates to a vehicle lamp that forms a high beam pattern and a low beam pattern in a single module.

According to an aspect of the present disclosure, a vehicle lamp may include a first light source unit including a plurality of first light sources and for irradiating a first light that forms a first beam pattern, a second light source unit including a plurality of second light sources and for irradiating a second light that forms a second beam pattern, a first reflector including a plurality of first reflection units corresponding to the plurality of first light sources and for reflecting the first light, and a second reflector including a plurality of second reflection units corresponding to the plurality of second light sources and for reflecting the second light. In particular, the plurality of first light sources may be disposed along an arc having a first curvature, and the plurality of second light sources may be disposed along an arc having a second curvature, where the second curvature is greater than the first curvature.

A distance between adjacent first light sources among the plurality of first light sources may increase going from a center to outward. A distance between adjacent second light sources among the plurality of second light sources may increase going from a center to outward. In some other embodiments, a distance between adjacent second light sources among the plurality of second light sources may decrease going from a center to outward.

A length of the arc formed by the plurality of second light sources may be smaller than a length of the arc formed by the plurality of first light sources.

The first reflector may be formed to protrude in one direction from the plurality of first reflection units, and may include an auxiliary reflection unit for reflecting the first light.

The vehicle lamp may further include a lens that transmits the first light and the second light reflected by the first reflector and the second reflector, and the lens may include an auxiliary beam pattern forming unit for forming an auxiliary beam pattern by transmitting the first light reflected by the auxiliary reflection unit in a predetermined direction. The auxiliary beam pattern forming unit may be disposed near a lower end of a light emitting surface of the lens. The auxiliary beam pattern may include a signal beam pattern.

In the second reflector, a step may be formed between an outermost reflection unit disposed at an outermost position among the plurality of second reflection units and an outermost-adjacent reflection unit disposed adjacent to the outermost reflection unit. The outermost reflection unit and the outermost-adjacent reflection unit may reflect the second light from at least one second light source. In some embodiments, the outermost reflection unit may reflect the second light toward a center of the second beam pattern, and the outermost-adjacent reflection unit may reflect the second light toward an edge of the second beam pattern.

The vehicle lamp may further include a heat dissipation unit that abuts the first light source unit and the second light source unit, which are disposed at different heights, and for dissipating heat from the first light source unit and the second light source unit. The heat dissipation unit may include a first heat dissipation plate that abuts the first light source unit and receives heat from the first light source unit, a second heat dissipation plate that abuts the second light source unit and receives heat from the second light source unit, and one or more heat dissipation pin for dissipating the heat of the first heat dissipation plate and the second heat dissipation plate. The first heat dissipation plate and the second heat dissipation plate may be disposed at different heights.

The first beam pattern may include a low beam pattern, and the second beam pattern may include a high beam pattern.

The vehicle lamp may further include a shield for selectively obstructing light reflected by the first reflector to form a boundary and a cut-off line of the first beam pattern. The shield may include a reflection region for reflecting incident light, and a cut-off inclination unit formed to be elongated in one direction to allow the reflection region to be bent to include an inclined surface. In particular, the cut-off inclination unit may extend toward a vicinity of a boundary of a first reflection unit disposed near a center among the plurality of first reflection units and a first reflection unit adjacent thereto.

A width of the second reflector may be shorter than a width of the first reflector.

With the vehicle lamp according to the embodiment of the present described as described herein, since the high beam pattern and the low beam pattern are formed in one module, space utilization can be improved and manufacturing cost can be reduced.

BRIEF DESCRIPTION OF THE DRAWINGS

These and/or other aspects will become more apparent and more readily appreciated from the following description of the embodiments, taken in conjunction with the accompanying drawings in which.

DETAILED DESCRIPTION

Figure 1:
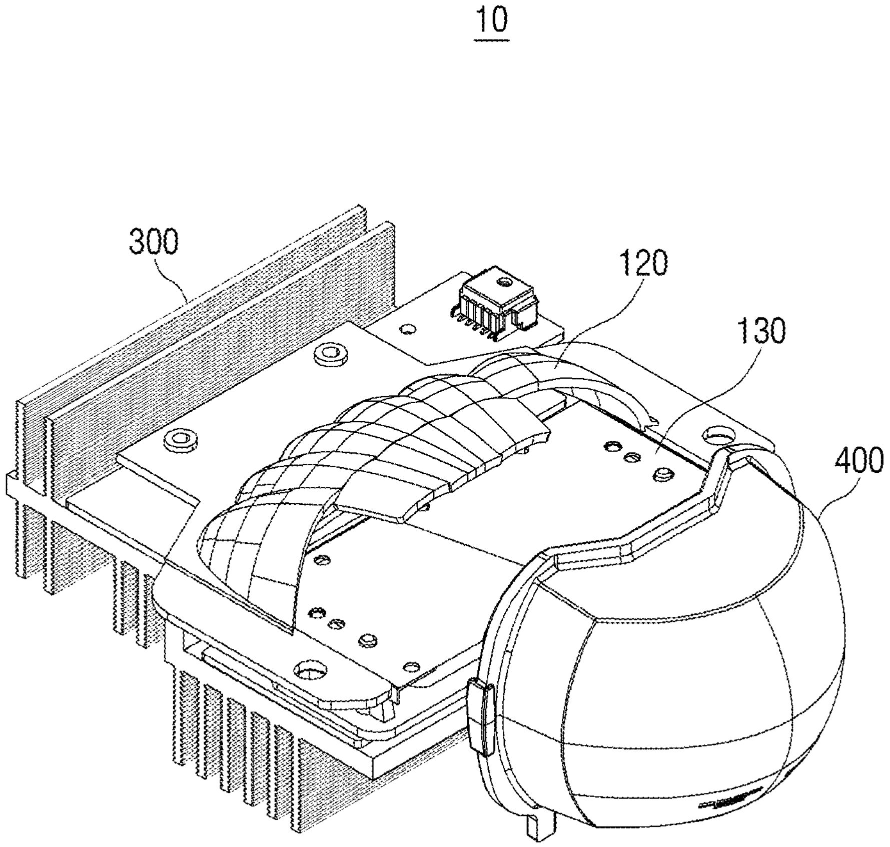
FIG. 1 is a perspective view of a vehicle lamp according to an embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Throughout the specification, like reference numerals in the drawings denote like elements.

In some embodiments, well-known steps, structures, and techniques will not be described in detail to avoid obscuring the disclosure.

The terminology used herein is for the purpose of describing particular exemplary embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Embodiments of the invention are described herein with reference to plan and cross-section illustrations that are schematic illustrations of exemplary embodiments of the invention. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing. In the drawings, respective components may be enlarged or reduced in size for convenience of explanation.

Hereinafter, the present disclosure will be described with reference to the drawings for describing a vehicle lamp according to embodiments of the present disclosure.

Figure 2:
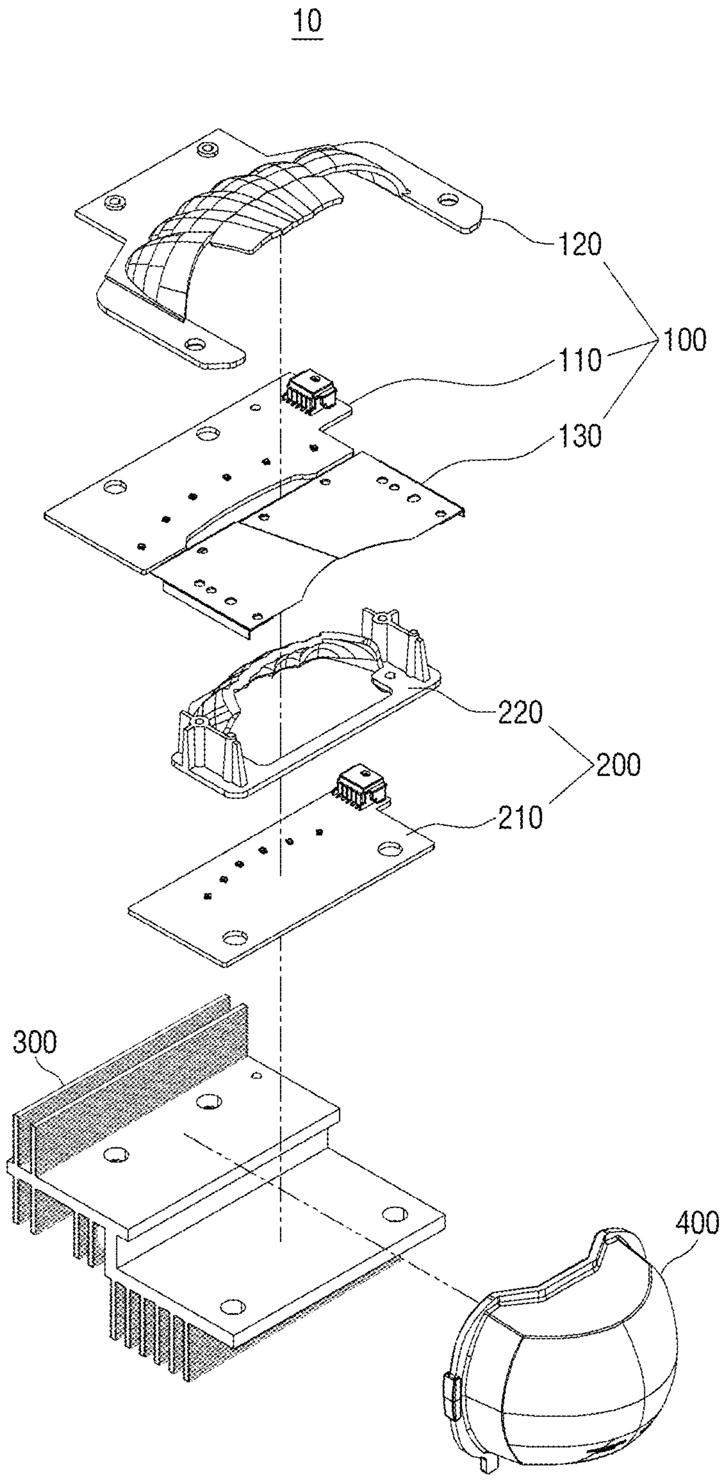
FIG. 2 is an exploded perspective view of a vehicle lamp according to an embodiment of the present disclosure.
Figure 3:
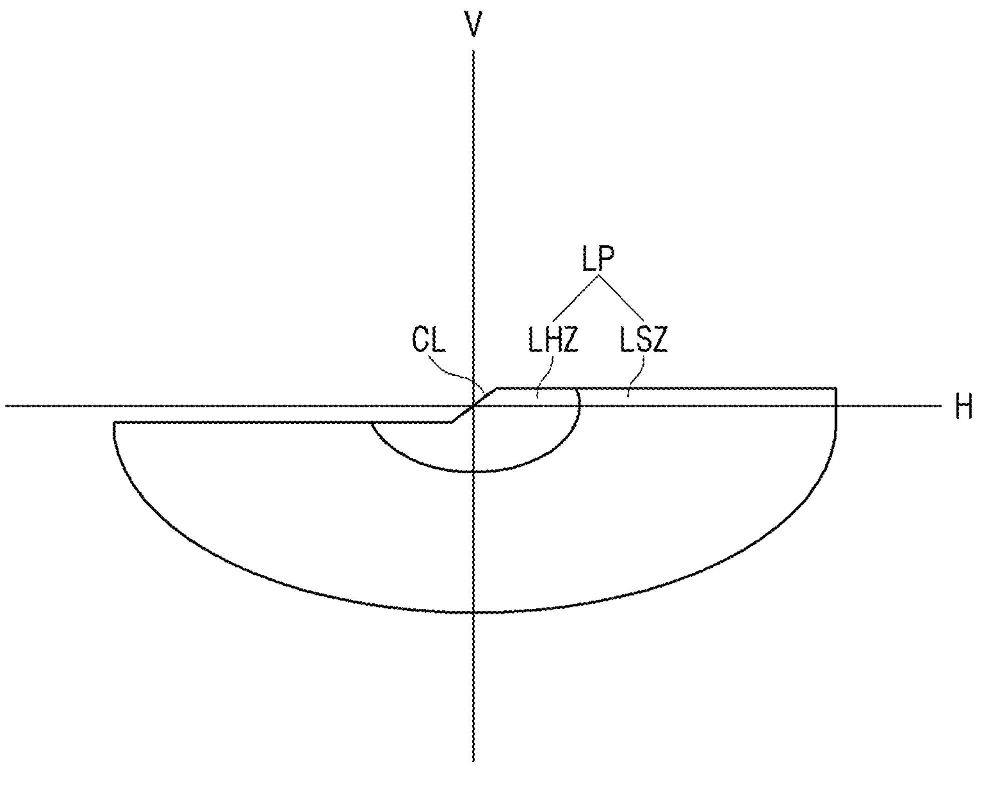
FIG. 3 shows a first beam pattern.
Figure 4:
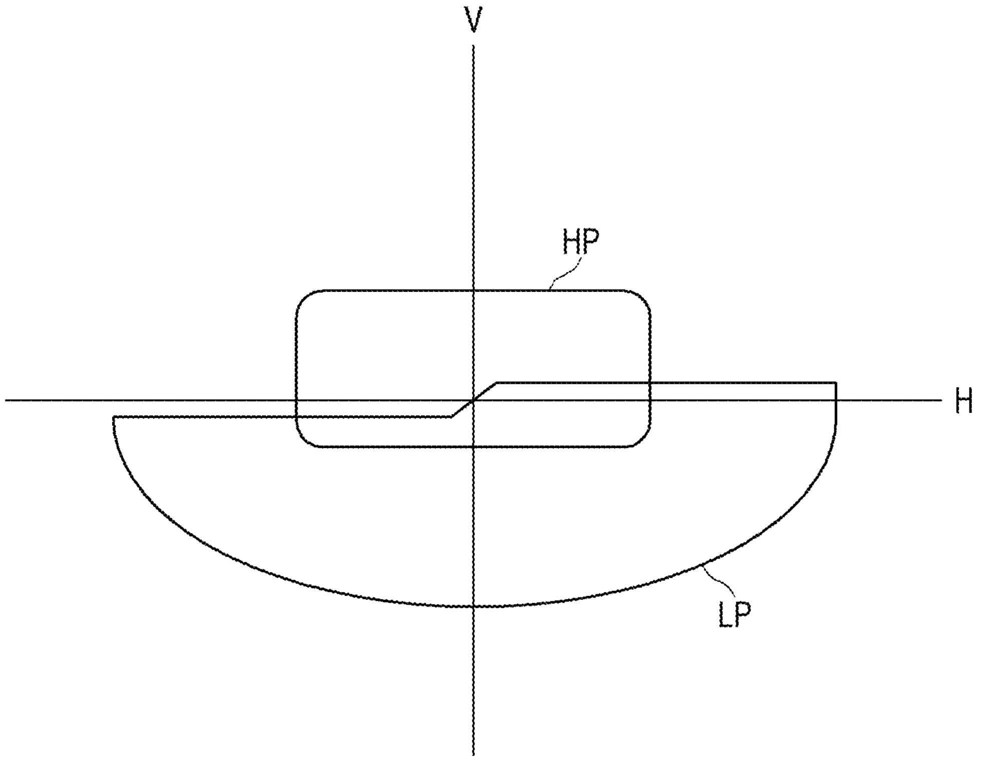
FIG. 4 shows a composite beam pattern of a first beam pattern and a second beam pattern.

FIG. 1 is a perspective view of a vehicle lamp according to an embodiment of the present disclosure, FIG. 2 is an exploded perspective view of a vehicle lamp according to an embodiment of the present disclosure, FIG. 3 shows a first beam pattern, and FIG. 4 shows a composite beam pattern of a first beam pattern and a second beam pattern.

Referring to FIGS. 1 and 2, a vehicle lamp 10 according to an embodiment of the present disclosure includes a first beam pattern forming unit 100, a second beam pattern forming unit 200, a heat dissipation unit 300, and a lens 400.

The first beam pattern forming unit 100 may form a first beam pattern. The first beam pattern forming unit 100 may include a first light source unit 110, a first reflector 120, and a shield 130.

The first light source unit 110 may irradiate first light for forming the first beam pattern. The first light source unit 110 may include a first light source 111 (see FIG. 5) and a first substrate 112 (see FIG. 5). The first light source 111 may irradiate the first light. In particular, a plurality of first light sources 111 may be provided. The first substrate 112 may support the first light source 111. A plurality of first light sources 111 may be disposed on one side of the first substrate 112. The first substrate 112 may receive power from outside and deliver it to the first light source 111. The first light source 111 may generate and irradiate the first light based on the power delivered via the first substrate 112.

The shield 130 may be used to form the first beam pattern. Some of the first light irradiated from the first light source 111 may be obstructed from being irradiated to the lens 400 since it is blocked by the shield 130. Accordingly, the first beam pattern may be formed corresponding to the shape of the shield 130.

The first reflector 120 may reflect the first light. The first reflector 120 may include a plurality of first reflection units 121 (see FIG. 6) corresponding to the plurality of first light sources 111. The plurality of first reflection units 121 may be disposed adjacent to the plurality of first light sources 111, respectively. Each of the first reflection units 121 may reflect the first light of the corresponding first light source 111.

The second beam pattern forming unit 200 may form a second beam pattern. The second beam pattern forming unit 200 may include a second light source unit 210 and a second reflector 220.

The second light source unit 210 may irradiate second light for forming the second beam pattern. The second light source unit 210 may include a second light source 211 (see FIG. 9) and a second substrate 212 (see FIG. 9). The second light source 211 may irradiate the second light. In particular, a plurality of second light sources 211 may be provided. The second substrate 212 may support the second light source 211. A plurality of second light sources 211 may be disposed on one side of the second substrate 212. The second substrate 212 may receive power from outside and deliver it to the second light source 211. The second light source 211 may generate and irradiate the second light based on the power delivered via the second substrate 212.

The second reflector 220 may reflect the second light. The second reflector 220 may include a plurality of second reflection units (see FIG. 10) corresponding to the plurality of second light sources 211. The plurality of second reflection units may be disposed adjacent to the plurality of second light sources 211, respectively. Each second reflection unit may reflect the second light of the corresponding second light source 211.

The heat dissipation unit 300 may dissipate heat from the first light source unit 110 and the second light source unit 210. The first light source unit 110 and the second light source unit 210 may be disposed at different heights. The heat dissipation unit 300 may be in close contact with the first light source unit 110 and the second light source unit 210 disposed at different heights to dissipate the heat from the first light source unit 110 and the second light source unit 210.

The lens 400 may transmit the first light and the second light reflected by the first reflector 120 and the second reflector 220, respectively. The first light transmitted from the lens 400 may form a first beam pattern, and the second light transmitted from the lens 400 may form a second beam pattern.

In the present disclosure, the first beam pattern may correspond to a low beam pattern, and the second beam pattern may correspond to a high beam pattern. The low beam pattern may secure a near field of view in front of the vehicle, and the high beam pattern may secure a far field of view in front of the vehicle.

Referring to FIG. 3, the low beam pattern LP may include a cut-off line CL. The cut-off line CL may include an inclined line that crosses the center of the beam pattern forming surface. Due to the inclination, left and right sides of the low beam pattern LP may have different heights with respect to the cut-off line CL.

The low beam pattern LP may include a concentrated light region LHZ and a diffused light region LSZ. The concentrated light region LHZ may be formed by concentrating light, and the diffused light region LSZ may be formed by diffusing light around the edge of the concentrated light region LHZ. In other words, the concentrated light region LHZ may exhibit higher brightness than the diffused light region LSZ. The concentrated light region LHZ may be irradiated to the near field front region where the driver's attention is concentrated, and the near front view of the vehicle may be more effectively secured by the concentrated light region LHZ.

Referring to FIG. 4, the low beam pattern LP and the high beam pattern HP may be simultaneously formed. When the low beam pattern LP and the high beam pattern HP are simultaneously formed, an overlapping region, in which at least a portion of each of the low beam pattern LP and the high beam pattern HP overlaps, may be formed. Alternatively, according to some embodiments of the present disclosure, the low beam pattern LP and the high beam pattern HP may not include overlapping regions. For example, the high beam pattern HP may be formed to be adjacent to the boundary of the low beam pattern LP.

Hereinafter, detailed structures and functions of each component constituting the vehicle lamp 10 will be described with reference to FIGS. 5 to 14.

Figure 5:
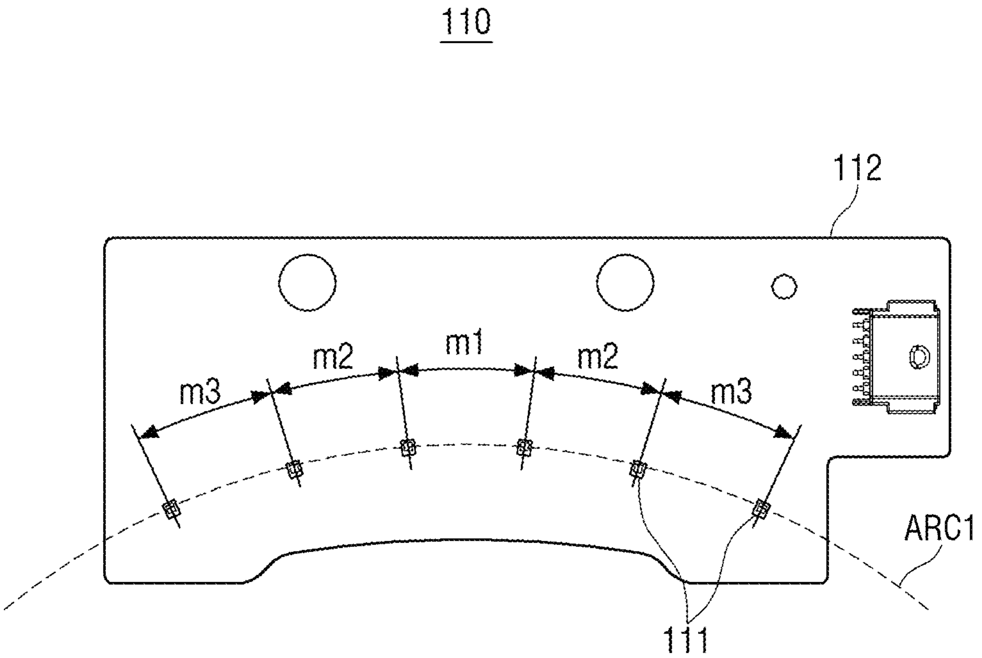
FIG. 5 is a plan view of a first light source unit according to an embodiment of the present disclosure.

FIG. 5 is a plan view of a first light source unit. Referring to FIG. 5, the first light source unit 110 may include a first light source 111 and a first substrate 112.

A plurality of first light sources 111 may be disposed on the first substrate 112. The plurality of first light sources 111 may be disposed along a shape of an arc ARC1 having a first curvature. A distance between adjacent first light sources 111 among the plurality of first light sources 111 may increase from the center to the both edges. Referring to FIG. 5, m2 may be longer than m1, and m3 may be longer than m2. The first light source 111 disposed at the center among the plurality of first light sources 111 may irradiate light to the central region of the first beam pattern, and the first light sources 111 disposed at the edge regions among the plurality of first light sources 111 may irradiate light to the edge regions of the first beam pattern. As the distance between the first light sources 111 disposed at the center among the plurality of first light sources 111 is formed to be smaller than the distance between the first light sources 111 disposed at the edges, the light may be more concentrated at the central region of the first beam pattern.

Figure 6:
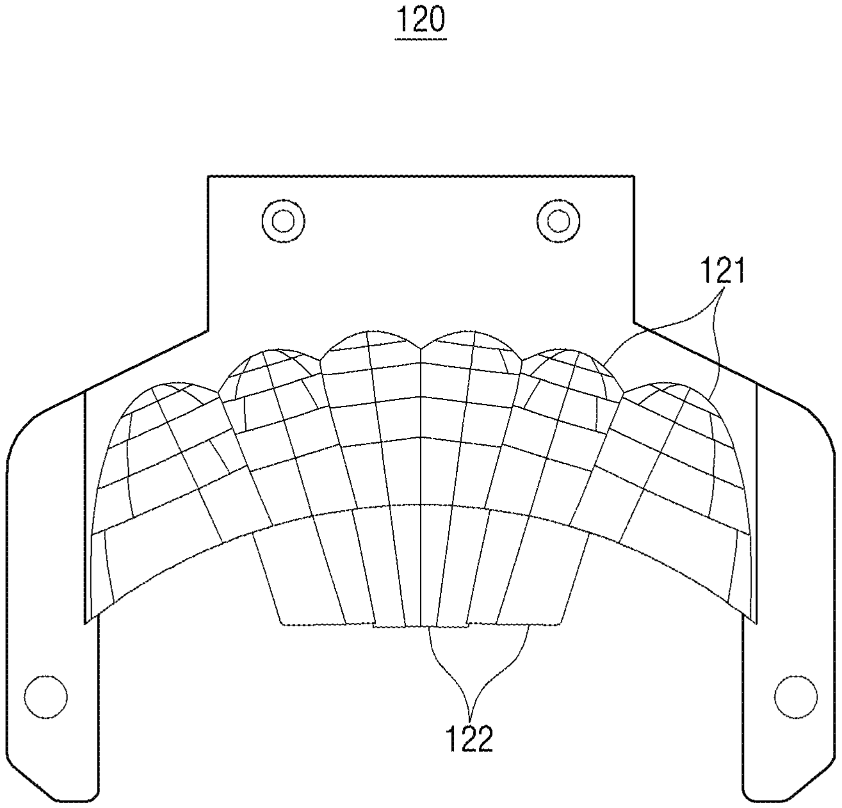
FIG. 6 is a plan view of a first reflector according to an embodiment of the present disclosure.

FIG. 6 is a plan view of the first reflector. Referring to FIG. 6, the first reflector 120 may include a plurality of first reflection units 121. The plurality of first reflection units 121 may reflect the first light irradiated from the plurality of first light sources 111. The first reflector 120 may include an auxiliary reflection unit 122. The auxiliary reflection unit 122 may protrude from the plurality of first reflection units 121 in one direction (e.g., forward) and may reflect the first light. The first light irradiated from some of the first light sources 111 among the plurality of first light sources 111 may be reflected to the auxiliary reflection unit 122. A plurality of auxiliary reflection units 122 may be provided. For example, four (4) auxiliary reflection units 122 may be provided. Each auxiliary reflection unit 122 may reflect the first light of the corresponding first light source 111.

The first light reflected by the auxiliary reflection unit 122 may pass through the lens 400 to form an auxiliary beam pattern, which will be discussed in more detail later below. In the present disclosure, the auxiliary beam pattern may be a signal beam pattern. The signal beam pattern may be a beam pattern formed on the front upper side of the vehicle and used for recognizing a road sign.

Figure 7:
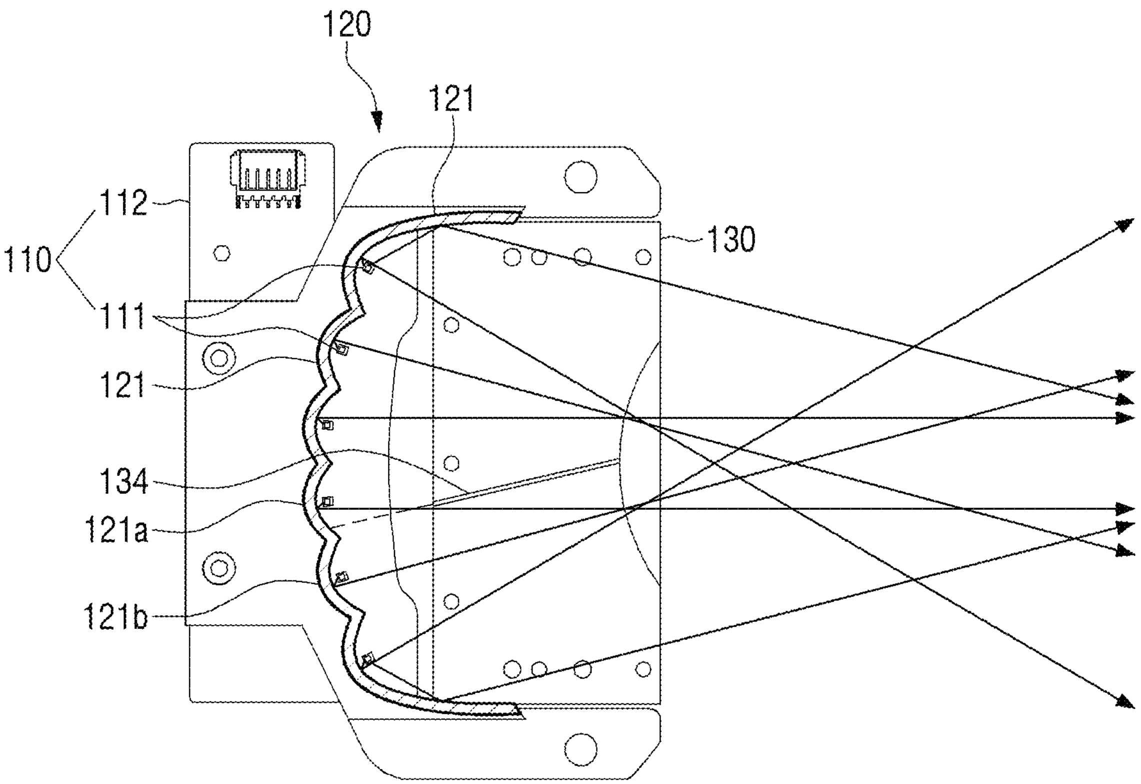
FIG. 7 depicts light that is irradiated by a first beam pattern forming unit.
Figure 8:
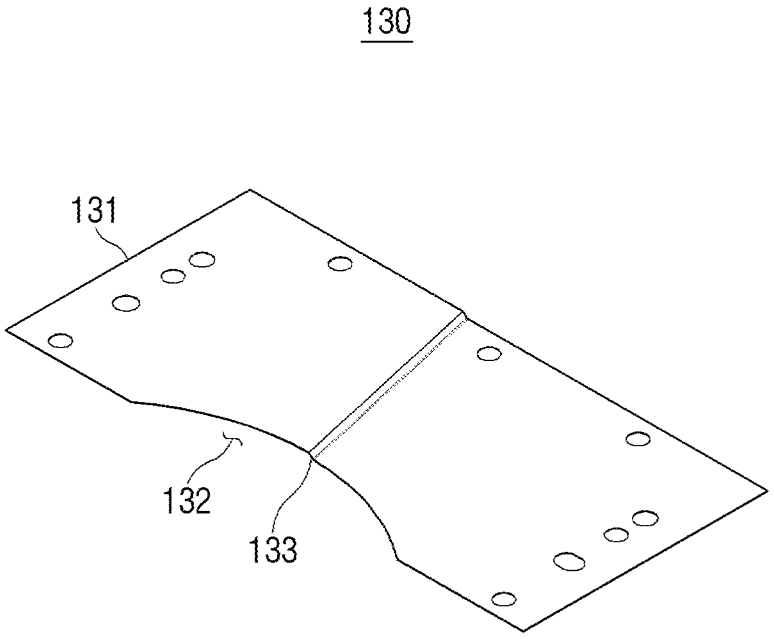
FIG. 8 is a perspective view of a shield according to an embodiment of the present disclosure.

FIG. 7 depict light that is irradiated by the first beam pattern forming unit, and FIG. 8 is a perspective view of the shield. Referring to FIG. 7, the light irradiated from the first light source 111 may be reflected by the first reflection unit 121. The first reflection unit 121 may be provided adjacent to each of the first light sources 111. The first light irradiated from one first light source 111 may be reflected by the corresponding first reflection unit 121. The first light reflected by the first reflection unit 121 may be irradiated toward the lens 400. Some of the light reflected by the first reflection unit 121 may be irradiated to the shield 130. The shield 130 may selectively block the light reflected by the first reflection unit 121 to form a boundary and a cut-off line CL of the first beam pattern.

Referring to FIG. 8, the shield 130 may include a reflection region 131, a transmission region 132, a cut-off forming unit 133, and a cut-off inclination unit 134. The reflection region 131 may reflect incident light. Among the entire region of the shield 130, light that reaches the reflection region 131 may be blocked and may be prevented from being delivered to the lens 400, or may be indirectly delivered to the lens 400 after being reflected by the reflection region 131. The light delivered to the transmission region 132 among the entire region of the shield 130 may pass through the transmission region 132 and be delivered to the lens 400.

The cut-off forming unit 133 may be formed between the reflection region 131 and the transmission region 132. The cut-off forming unit 133 may block the light passing through the transmission region 132 in a predetermined shape to form the cut-off in the low beam pattern LP. The cut-off line CL included in the above-described low beam pattern LP may be formed by the cut-off forming unit 133.

The cut-off inclination unit 134 (see FIG. 7) may be formed to be elongated in one direction such that the reflection region 131 is bent to include the inclined surface. The cut-off inclination unit 134 may be formed to extend from the cut-off forming unit 133 toward the first reflection unit 121. Referring to FIG. 7, the cut-off inclination unit 134 may extend toward the vicinity of the boundary of a first reflection unit 121*a* (hereinafter, referred to as a central reflection unit) disposed proximate to the center of the first reflection units 121 and a first reflection unit 121*b* adjacent thereto (hereinafter, referred to as an adjacent reflection unit).

Light reflected by the central reflection unit 121*a* and the adjacent reflection unit 121*b* may be used to form the concentrated light region LHZ in the low beam pattern LP. As some of the light reflected by the central reflection unit 121*a* and the adjacent reflection unit 121*b* is irradiated to the cut-off inclination unit 134, the cut-off line CL in the concentrated light region LHZ may be more distinctly formed.

Figure 9:
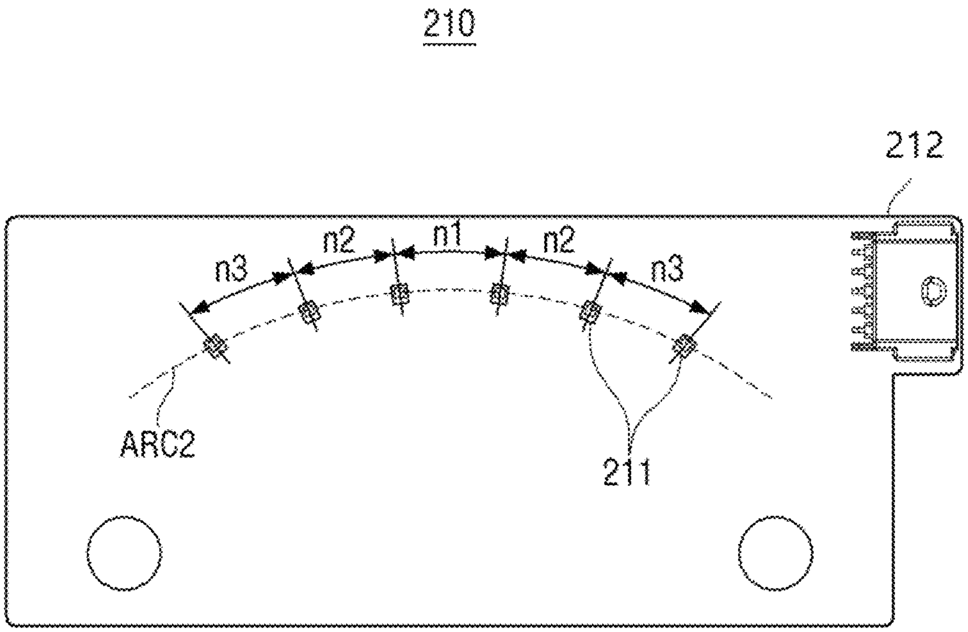
FIG. 9 is a plan view of a second light source unit according to an embodiment of the present disclosure.

FIG. 9 is a plan view of the second light source unit. Referring to FIG. 9, the second light source unit 210 may include a second light source 211 and a second substrate 212. A plurality of second light sources 211 may be disposed on the second substrate 212. The plurality of second light sources 211 may be disposed along a shape of an arc ARC2 having a second curvature. A distance between adjacent second light sources 211 among the plurality of second light sources 211 may increase from the center to the both edges. Referring to FIG. 9, n2 may be longer than n1, and n3 may be longer than n2.

The second light source 211 disposed at the center among the plurality of second light sources 211 may irradiate light to the central region of the second beam pattern, and the second light source 211 disposed at the edges among the plurality of second light sources 211 may irradiate light to the edge regions of the second beam pattern. As the distance between the second light sources 211 disposed at the center among the plurality of second light sources 211 is formed to be smaller than the distance between the second light sources 211 disposed at the edges, the light may be more concentrated on the central region of the second beam pattern.

Meanwhile, according to some embodiments of the present disclosure, a distance between adjacent second light sources 211 among the plurality of second light sources 211 may decrease going from the center to the edges. In this case, the light from the second light source 211 near the edges among the plurality of second light sources 211 may be more concentrated on the edge regions of the second beam pattern.

The length of the arc ARC2 formed by the plurality of second light sources 211 (hereinafter, referred to as the second arc length) may be smaller than the length of the arc ARC1 formed by the plurality of first light sources 111 (hereinafter, referred to as the first arc length). In other words, the distance between the second light sources 211 disposed at both ends of the plurality of second light sources 211, measured along the arc ARC2, may be smaller than the distance between the first light sources 111 disposed at both ends of the plurality of first light sources 111, measured along the arc ARC1. In addition, a second curvature of the arc ARC2 formed by the plurality of second light sources 211 may be greater than a first curvature of the arc ARC1 formed by the plurality of first light sources 111. In other words, a radius of curvature of the arc ARC1 may be greater than a radius of curvature of the arc ARC2.

As the second arc length is formed to be smaller than the first arc length and the second curvature is formed to be greater than the first curvature, the plurality of second light sources 211 may form a beam pattern by concentrating light onto a smaller region than the plurality of first light sources 111. Accordingly, as shown in FIG. 4, the high beam pattern HP may have a smaller size than the low beam pattern LP. As light is concentrated on a relatively small region, the high beam pattern HP may provide a far field vision.

Figure 10:
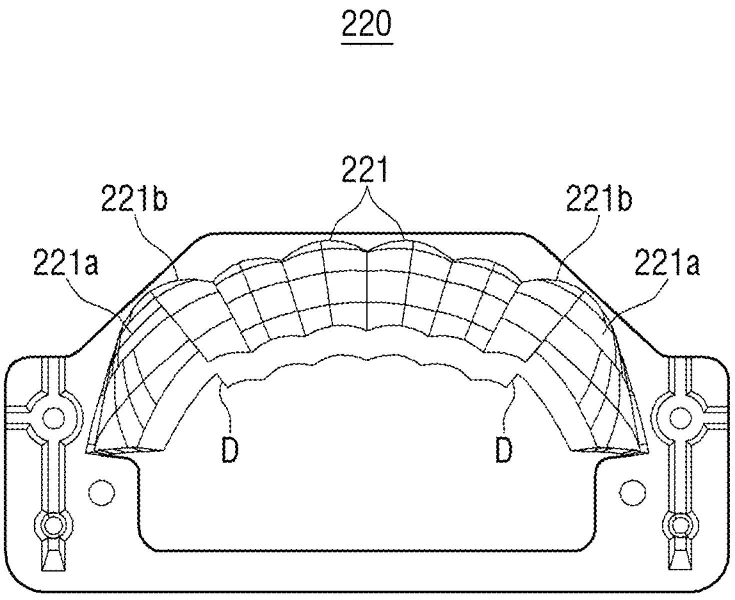
FIG. 10 is a plan view of a second reflector according to an embodiment of the present disclosure.

FIG. 10 is a plan view of the second reflector. Referring to FIG. 10, the second reflector 220 may include a plurality of second reflection units 221. The plurality of second reflection units 221 may reflect the second light irradiated from the plurality of second light sources 211.

A step D may be formed between the outermost reflection unit 221*a* disposed at the outermost position among the plurality of second reflection units 221 and the outermost-adjacent reflection unit 221*b* adjacent thereto. The outermost reflection unit 221*a* and the outermost-adjacent reflection unit 221*b* may reflect the second light from the at least one second light source 211. A portion of the second light irradiated from the at least one first light source 111 may be reflected by the outermost reflection unit 221*a*, and another portion may be reflected by the outermost-adjacent reflection unit 221*b*.

Figure 11:
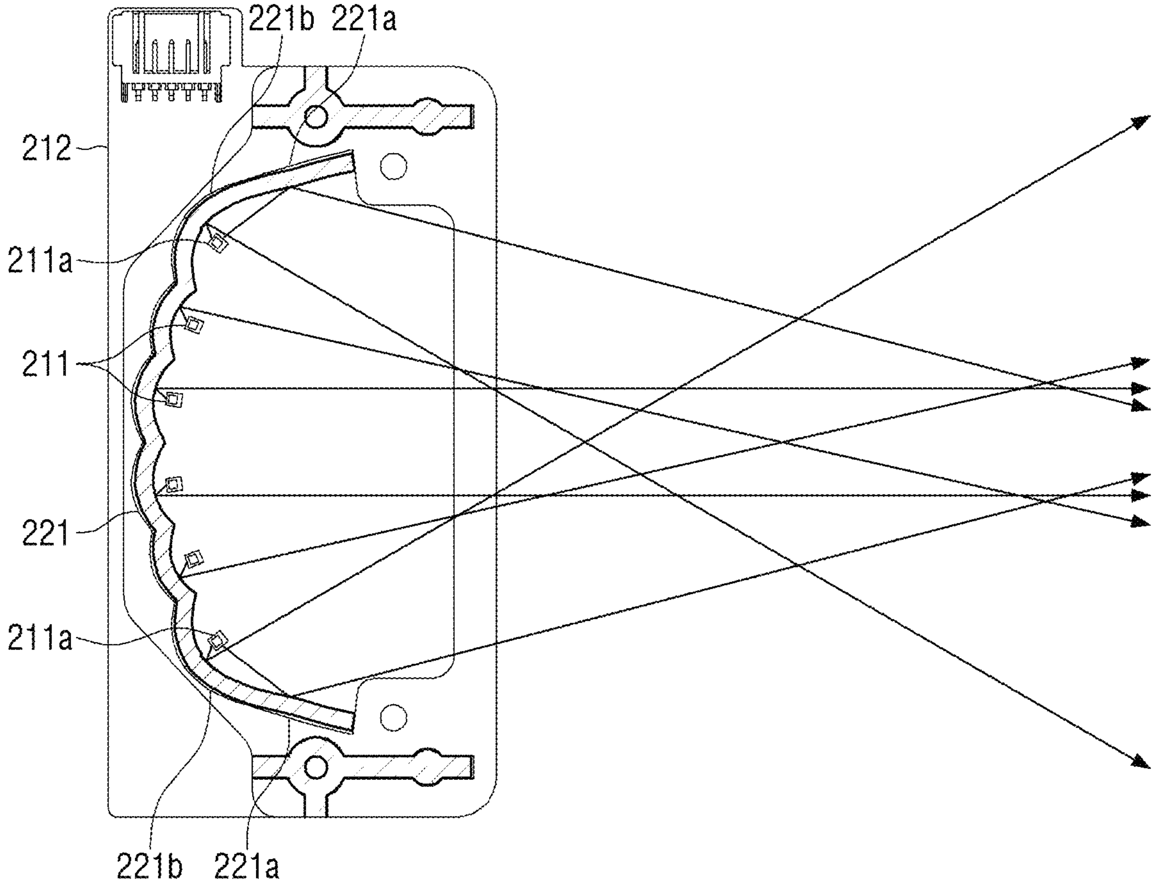
FIG. 11 depicts light that is irradiated by a second beam pattern forming unit.

FIG. 11 depicts light that is irradiated by a second beam pattern forming unit. Referring to FIG. 11, the light irradiated from the second light source 211 may be reflected by the second reflection unit 221. A second reflection unit 221 may be provided adjacent to each second light source 211. The second light irradiated from the at least one second light source 211 may be reflected by the corresponding second reflection unit 221. The second light reflected by the second reflection unit 221 may be irradiated toward the lens 400.

Light irradiated from the outermost light source 211*a* disposed at the outermost position among the plurality of second light sources 211 may be reflected by the outermost reflection unit 221*a* and the outermost-adjacent reflection unit 221*b*. As described above, since a step D may be formed between the outermost reflection unit 221*a* and the outermost-adjacent reflection unit 221*b*, the second light reflected by the outermost reflection unit 221*a* and the outermost-adjacent reflection unit 221*b* may be used to form different regions of the second beam pattern. More particularly, the outermost reflection unit 221*a* may reflect the second light toward the center of the second beam pattern, and the outermost-adjacent reflection unit 221*b* may reflect the second light toward the edge of the second beam pattern.

The brightness of the central region of the second beam pattern may be improved by the second light reflected by the outermost reflection unit 221*a*. The outermost-adjacent reflection unit 221*b* may reflect only a portion of the second light irradiated from the at least one second light source 211. As the edge of the second beam pattern is formed by the second light reflected by the outermost-adjacent reflection unit 221*b*, an abrupt change in brightness between the inside and the outside of the boundary of the second beam pattern may be prevented.

Figure 12:
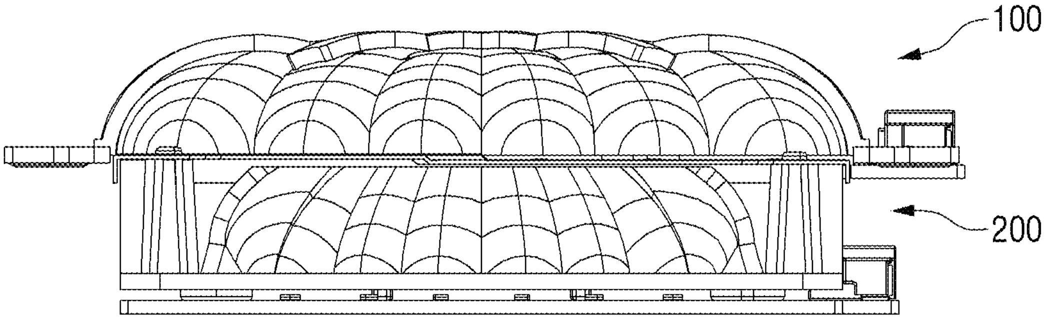
FIG. 12 depicts an arrangement relationship of a first beam pattern forming unit and a second beam pattern forming unit.

FIG. 12 is a front view for describing an arrangement relationship of a first beam pattern forming unit and a second beam pattern forming unit. Referring to FIG. 12, the first beam pattern forming unit 100 and the second beam pattern forming unit 200 may be disposed at different heights. More particularly, the first beam pattern forming unit 100 may be disposed above the second beam pattern forming unit 200. The first light irradiated from the first beam pattern forming unit 100 may be irradiated in a more downward direction while passing through the lens 400 to form a first beam pattern, and the second light irradiated from the second beam pattern forming unit 200 may be irradiated in a more upward direction while passing through the lens 400 to form a second beam pattern.

Figure 13:
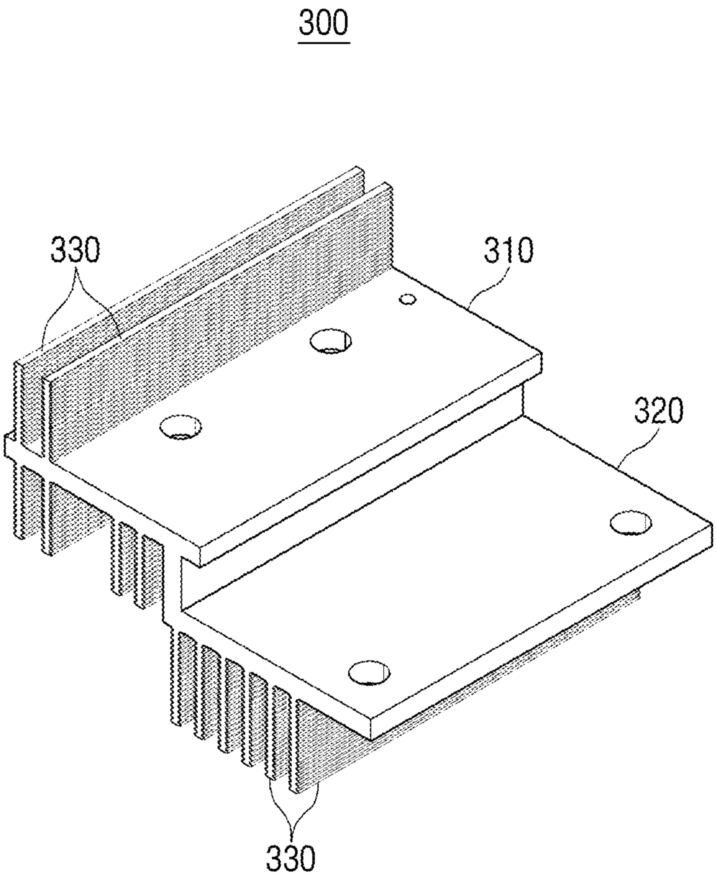
FIG. 13 is a perspective view of a heat dissipation unit according to an embodiment of the present disclosure.

FIG. 13 is a perspective view of a heat dissipation unit. Referring to FIG. 13, the heat dissipation unit 300 may include a first heat dissipation plate 310, a second heat dissipation plate 320, and a heat dissipation pin 330. The first heat dissipation plate 310 may abut the first light source unit 110 to receive heat from the first light source unit 110. The second heat dissipation plate 320 may abut the second light source unit 210 to receive heat from the second light source unit 210.

The first heat dissipation plate 310 and the second heat dissipation plate 320 may be disposed at different heights. Specifically, the first heat dissipation plate 310 may be disposed at a higher position than the second heat dissipation plate 320. The first heat dissipation plate 310 and the second heat dissipation plate 320 may be disposed in the shape of a step. In other words, the first heat dissipation plate 310 and the second heat dissipation plate 320 may have different horizontal distances from the lens 400 as well as different heights. In the present disclosure, the first heat dissipation plate 310 may be disposed farther from the lens 400 than the second heat dissipation plate 320. Meanwhile, according to some embodiments of the present disclosure, the first heat dissipation plate 310 may be disposed horizontally closer to the lens 400 than the second heat dissipation plate 320.

As described above, the first beam pattern forming unit 100 and the second beam pattern forming unit 200 may be disposed at different heights. In other words, the first light source unit 110 and the second light source unit 210 may be disposed at different heights, and specifically, the first light source unit 110 may be disposed at a higher position than the second light source unit 210. Since the first light source unit 110 and the second light source unit 210 may be disposed abutting the first heat dissipation plate 310 and the second heat dissipation plate 320, respectively, the heights of the first light source unit 110 and the second light source unit 210 may be determined by the first heat dissipation plate 310 and the second heat dissipation plate 320.

The heat dissipation pin 330 may dissipate heat from the first heat dissipation plate 310 and the second heat dissipation plate 320 to the outside. In particular, a plurality of heat dissipation pins 330 may be provided on the first heat dissipation plate 310 and the second heat dissipation plate 320, respectively. The plurality of heat dissipation pins 330 may be disposed with a predetermined distance therebetween. Accordingly, the heat delivered to heat dissipation unit 300 may be dissipated to the outside through the space around the heat dissipation unit 300. As the heat dissipation of the first light source unit 110 and the second light source unit 210 is performed using a common heat dissipation unit 300, the configuration of the vehicle lamp 10 may be more simplified, and assembly time may be reduced.

Figure 14:
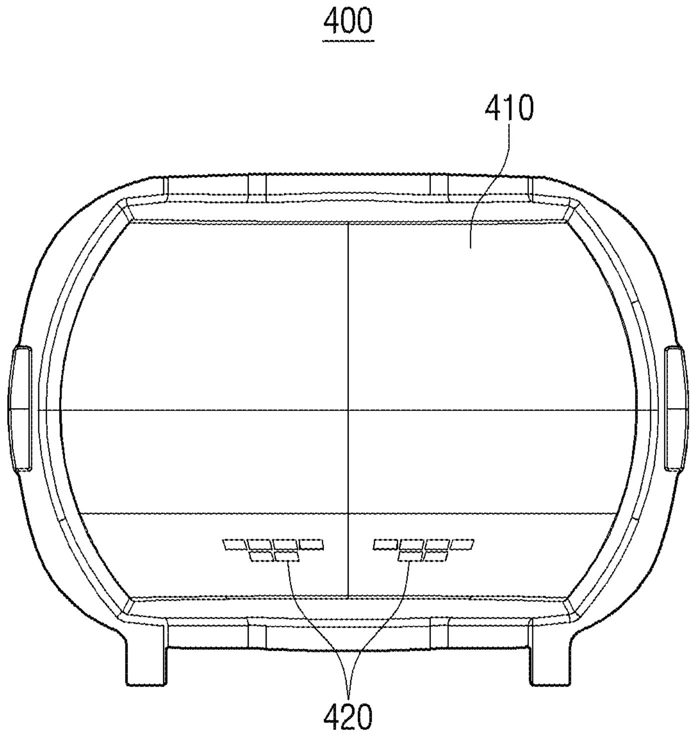
FIG. 14 is a front view of a lens according to an embodiment of the present disclosure.

FIG. 14 is a front view of the lens. Referring to FIG. 14, the lens 400 may include a light emitting surface 410. Accordingly, the first light reflected by the first reflector 120 and the second light reflected by the second reflector 220 may be emitted through the light emitting surface 410. The lens 400 may further include an auxiliary beam pattern forming unit 420. The auxiliary beam pattern forming unit 420 may form an auxiliary beam pattern by transmitting the first light reflected by the auxiliary reflection unit 122 of the first reflector 120 in a predetermined direction.

The auxiliary beam pattern forming unit 420 may be formed at the lower end of the light emitting surface 410 of the lens 400. The first light or the second light for forming the first beam pattern or the second beam pattern may be emitted to the central region of the light emission surface 410. Due to the auxiliary beam pattern forming unit 420 formed at the lower end of the light emitting surface 410, interference by the auxiliary beam pattern forming unit 420 may be prevented in forming the first beam pattern or the second beam pattern.

Figure 15:
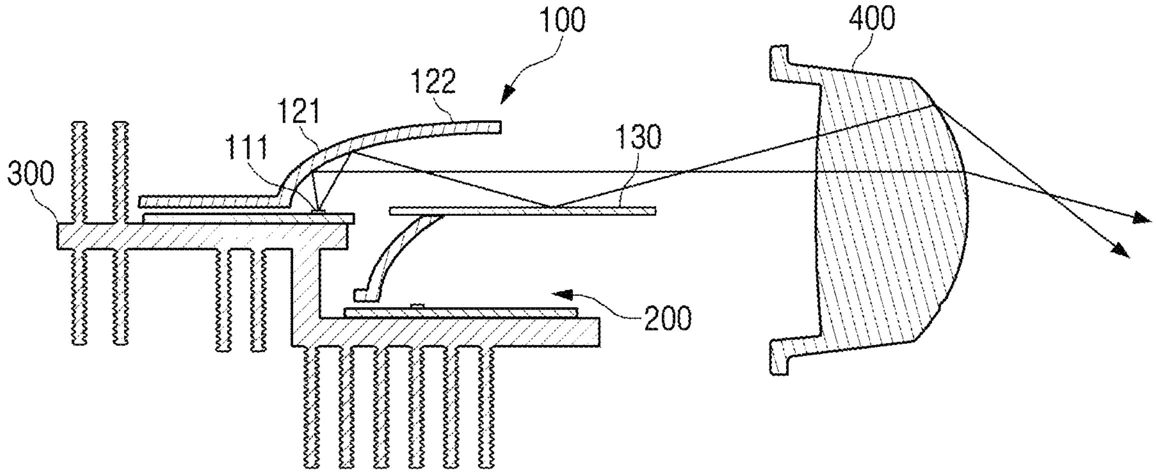
FIG. 15 is a cross-sectional view depicting light for forming a first beam pattern.

FIG. 15 is a cross-sectional view for depicting the light for forming a first beam pattern. Referring to FIG. 15, the first beam pattern forming unit 100 may irradiate light for forming the first beam pattern. The light irradiated from the first light source 111 may be reflected by the first reflection unit 121 and delivered to the lens 400. A portion of the light reflected by the first reflection unit 121 may be directly delivered to the lens 400, and another portion may be delivered to the lens 400 after being reflected by the shield 130. The light that passes through the lens 400 may form the first beam pattern while being irradiated in the downward direction.

Figure 16:
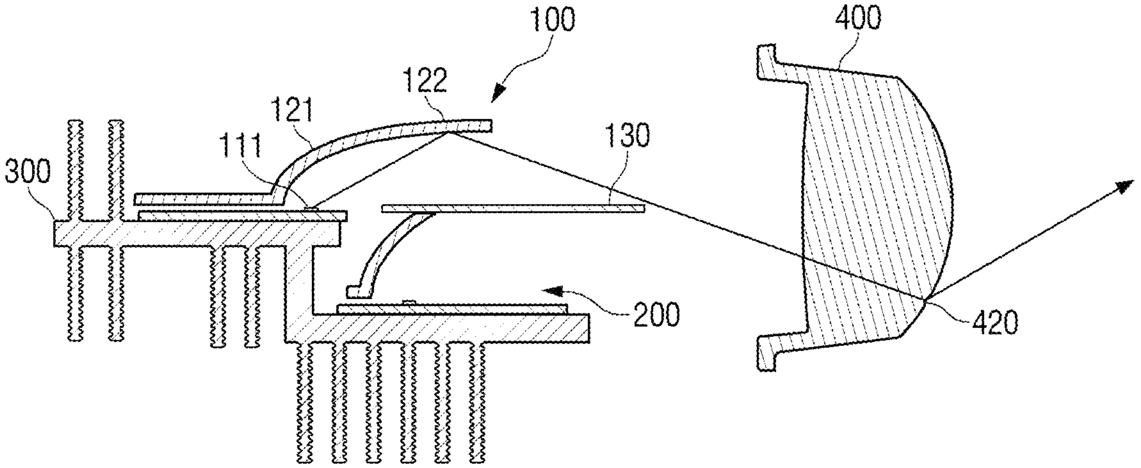
FIG. 16 is a cross-sectional view depicting light for forming an auxiliary beam pattern.

FIG. 16 is a cross-sectional view for depicting the light for forming an auxiliary beam pattern. Referring to FIG. 16, the first beam pattern forming unit 100 may irradiate light for forming an auxiliary beam pattern. The light irradiated from the first light source 111 may be reflected by the auxiliary reflection unit 122 and delivered to the lens 400. Since the lens 400 may include an auxiliary beam pattern forming unit 420, the light reflected from the auxiliary reflection unit 122 may reach the auxiliary beam pattern forming unit 420, and the light that passes through the auxiliary beam pattern forming unit 420 may be irradiated in an upward direction and may form the auxiliary beam pattern.

Figure 17:
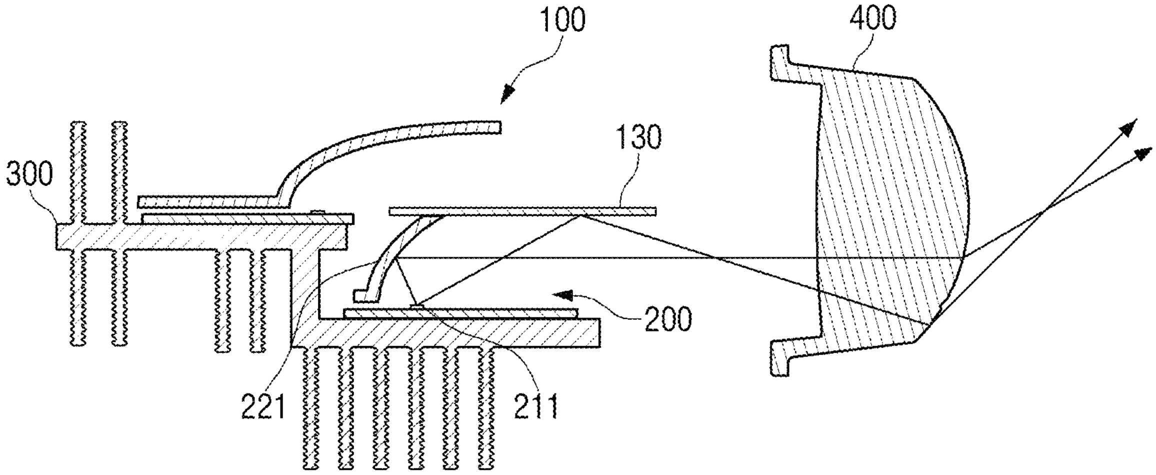
FIG. 17 is a cross-sectional view depicting light for forming a second beam pattern.

FIG. 17 is a cross-sectional view for depicting the light for forming a second beam pattern. Referring to FIG. 17, the second beam pattern forming unit 200 may irradiate light for forming the second beam pattern. The light irradiated from the second light source 211 may be reflected by the second reflection unit 221 and delivered to the lens 400. The light that passes through the lens 400 may form a second beam pattern while being irradiated in an upward direction. In particular, a portion of the light reflected by the second reflection unit 221 may be directly delivered to the lens 400, and another portion may be delivered to the lens 400 after being reflected by the shield 130. Since the light reflected by the shield 130 is used in forming the second beam pattern, the width of the second reflector 210 may be shorter than the width of the first reflector 110.

In concluding the detailed description, those skilled in the art will appreciate that many variations and modifications can be made to the exemplary embodiments without substantially departing from the principles of the present disclosure. Therefore, the disclosed exemplary embodiments are used in a generic and descriptive sense only and not for purposes of limitation.

What is claimed is:

1. A vehicle lamp comprising:

a first light source unit including a plurality of first light sources and for irradiating a first light that forms a first beam pattern;

a second light source unit including a plurality of second light sources and for irradiating a second light that forms a second beam pattern;

a first reflector including a plurality of first reflection units corresponding to the plurality of first light sources and for reflecting the first light; and a second reflector including a plurality of second reflection units corresponding to the plurality of second light sources and for reflecting the second light, wherein the plurality of first light sources include at least three light sources that are disposed substantially along a first arc having a first curvature, wherein the plurality of second light sources include at least three light sources that are disposed substantially along a second arc having a second curvature, and wherein the second curvature is greater than the first curvature.

2. The vehicle lamp of claim 1, wherein a distance between adjacent first light sources among the plurality of first light sources increases going from a center to outward.

3. The vehicle lamp of claim 1, wherein a distance between adjacent second light sources among the plurality of second light sources increases going from a center to outward.

4. The vehicle lamp of claim 1, wherein a distance between adjacent second light sources among the plurality of second light sources decreases going from a center to outward.

5. The vehicle lamp of claim 1, wherein a length of the arc formed by the plurality of second light sources is smaller than a length of the arc formed by the plurality of first light sources.

6. The vehicle lamp of claim 1, wherein the first reflector is formed to protrude from the plurality of first reflection units, and includes an auxiliary reflection unit for reflecting the first light.

7. The vehicle lamp of claim 6, further comprising:

a lens that transmits the first light and the second light reflected by the first reflector and the second reflector, wherein the lens includes an auxiliary beam pattern forming unit for forming an auxiliary beam pattern by transmitting the first light reflected by the auxiliary reflection unit in a predetermined direction.

8. The vehicle lamp of claim 7, wherein the auxiliary beam pattern forming unit is disposed near a lower end of a light emitting surface of the lens.

9. The vehicle lamp of claim 7, wherein the auxiliary beam pattern comprises a signal beam pattern.

10. The vehicle lamp of claim 1, wherein a step is formed between an outermost reflection unit disposed at an outermost position among the plurality of second reflection units and an outermost-adjacent reflection unit disposed adjacent to the outermost reflection unit.

11. The vehicle lamp of claim 10, wherein the outermost reflection unit and the outermost-adjacent reflection unit reflect the second light from at least one second light source.

12. The vehicle lamp of claim 11, wherein the outermost reflection unit reflects the second light toward a center of the second beam pattern, and wherein the outermost-adjacent reflection unit reflects the second light toward an edge of the second beam pattern.

13. The vehicle lamp of claim 1, further comprising:

a heat dissipation unit that abuts the first light source unit and the second light source unit, which are disposed at different heights, and for dissipating heat from the first light source unit and the second light source unit, wherein the heat dissipation unit comprises, a first heat dissipation plate that abuts the first light source unit and receives heat from the first light source unit;

a second heat dissipation plate that abuts the second light source unit and receives heat from the second light source unit; and one or more heat dissipation pin for dissipating the heat of the first heat dissipation plate and the second heat dissipation plate.

14. The vehicle lamp of claim 13, wherein the first heat dissipation plate and the second heat dissipation plate are disposed at different heights.

15. The vehicle lamp of claim 1, wherein the first beam pattern comprises a low beam pattern, and the second beam pattern comprises a high beam pattern.

16. The vehicle lamp of claim 1, further comprising a shield for selectively obstructing light reflected by the first reflector to form a boundary and a cut-off line of the first beam pattern.

17. The vehicle lamp of claim 16, wherein the shield comprises:

a reflection region for reflecting incident light; and a cut-off inclination unit formed to be elongated in one direction to allow the reflection region to be bent to include an inclined surface, wherein the cut-off inclination unit extends toward a vicinity of a boundary of a first reflection unit disposed near a center among the plurality of first reflection units and a first reflection unit adjacent thereto.

18. The vehicle lamp of claim 1, wherein a width of a second reflection unit facing the lens is shorter than a width of the first reflection unit facing the lens.

* * * * *